April 1, 1924.
T. W. PRALL
1,488,831
TRAP FOR FLUID CONDUITS
Filed Feb. 20, 1922
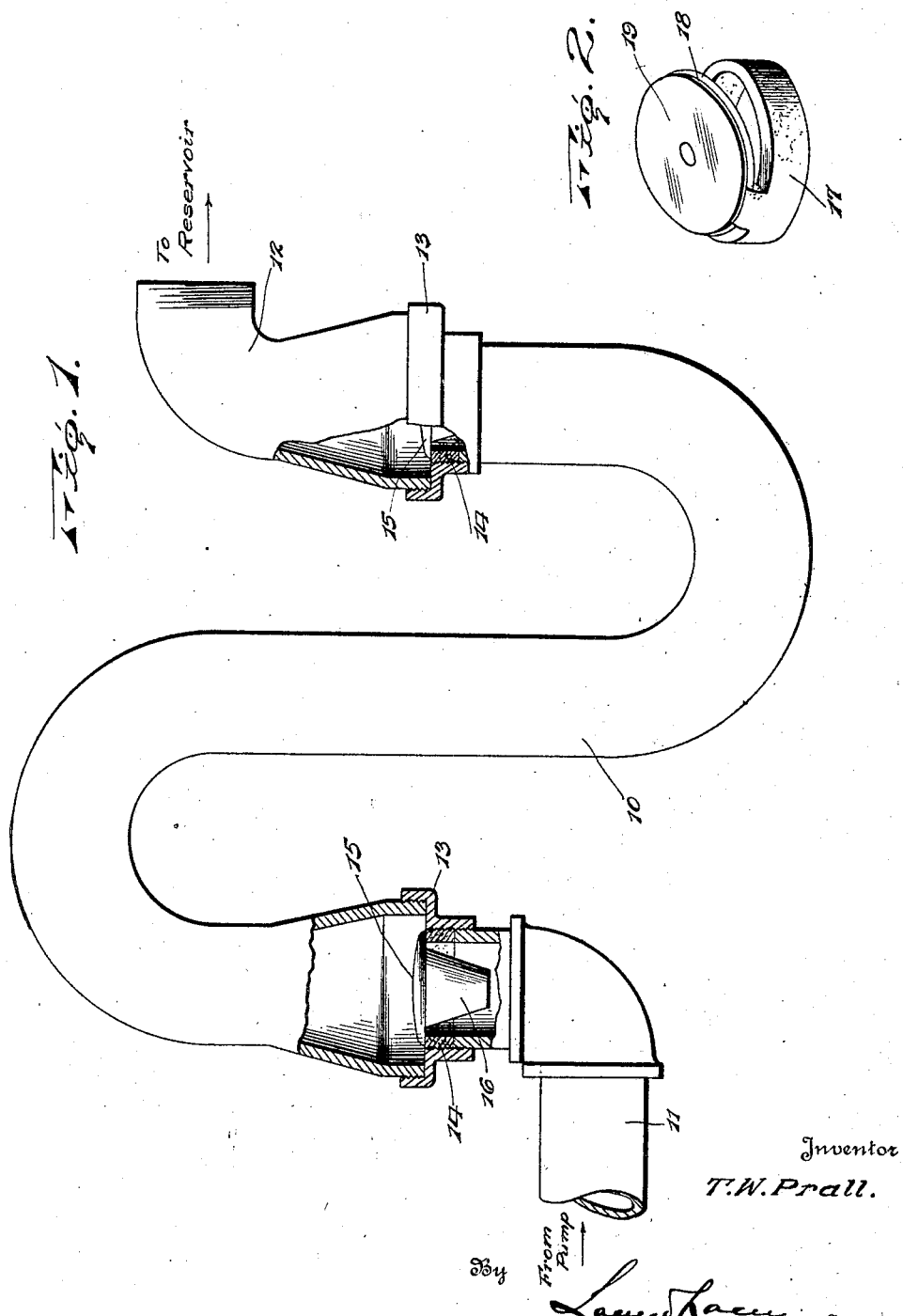
Inventor
T. W. Prall.
By Lacy & Lacy, Attorneys Patented Apr. 1, 1924.

1,488,831

UNITED STATES PATENT OFFICE.

THOMAS W. PRALL, OF ATLANTIC, IOWA.

TRAP FOR FLUID CONDUITS.

Application filed February 20, 1922. Serial No. 538,056.

*To all whom it may concern:*

Be it known that I, THOMAS W. PRALL, citizen of the United States, residing at Atlantic, in the county of Cass and State of Iowa, have invented certain new and useful Improvements in Traps for Fluid Conduits, of which the following is a specification.

My invention relates to conduits for water, oil, air, steam or gas and has for its main object, to provide an insert in such conduits, which constitutes a trap therein to prevent back flow of the fluid. In other words, the insert forms a double seal in the conduit, permitting flow in one direction only.

The invention is clearly illustrated in the accompanying drawing and:

Figure 1 shows the insert in elevation and partial section, and

Figure 2, in perspective view, one form of flap valve employed.

The insert consists of an S-shaped pipe 10 placed with the bends thereof in a vertical plane. This insert has one end connected with a pressure pump through a pipe 11 and the other end thereof is similarly connected, by means of an elbow 12, with a discharge pipe line. At the intake end of the insert I provide a cage 13 with an asbestos or metallic seat 14 for the valve 15. This valve has a mushroom shaped head and a tapered downwardly directed stem 16 for guiding it in the seat. This construction is best suited for steam or air lines and when the conduit is intended for water or oil, the construction shown in Figure 2 is substituted for the valve just described. This consists of a leather gasket 17 with a flap valve 18 provided with a metallic cap 19 for closing the valve. The valve 15 is preferably metallic.

Valves of the same construction are provided at both ends of the insert; that is to say, for air or steam, the valve 15 is used at both ends of the insert while for water or oil, the valve construction shown in Figure 2 is used in both places.

Assuming that the conduit is used for air, the compressed air from a pump enters through the intake valve 15 in the direction of the arrow and lifts the valve at this point. Directly the pressure from this end ceases, the valve closes and the air is trapped in the S-shaped insert 10 until the next pulsation of the pump, when the air proceeds through the second valve, which also closes directly the pressure in the rear is less than in front. In this manner, a double seal is provided, so that if leakage should occur at one of the valves, it is most unlikely to also occur at the other. When using the valve disclosed in Figure 2, oil or water passing through the pipe will be similarly trapped and sealed by the valves in the insert.

Having thus described the invention, what is claimed as new is:

1. A one way valve comprising a cage adapted to be attached to a fluid conduit, an annular seat inserted in said cage having a thin, flat upper edge, a valve member having a head with a flat bottom surface engaging by gravity said flat upper edge of the seat, and a downwardly directed shank on one side of said head merging into said edge of the seat, said head, shank and seat forming integral parts.

2. A one way valve comprising a cage adapted to be attached to a fluid conduit, an annular seat of leather inserted in said cage having a thin, flat upper edge, a valve member having a metallic top and flat leather head engaging by gravity said thin upper edge of the seat, and a downwardly directed shank on one side of said head merging into said seat and guiding said valve head into closing position, said head, shank and seat forming integral parts.

In testimony whereof I affix my signature.

THOMAS W. PRALL. [L. S.]